United States Patent [19]

Miller et al.

[11] Patent Number: 5,647,473

[45] Date of Patent: Jul. 15, 1997

[54] METHOD AND APPARATUS FOR ALIGNING AND SPACING ARTICLES ON A CONVEYOR BELT

[75] Inventors: Roy R. Miller; Brian K. Clark, both of Eugene, Oreg.

[73] Assignee: Bulk Handling Systems, Inc., Eugene, Oreg.

[21] Appl. No.: 386,959

[22] Filed: Feb. 10, 1995

[51] Int. Cl.$^6$ .................................................. B65G 47/31
[52] U.S. Cl. ........................ 198/461.2; 198/443; 198/448
[58] Field of Search ............................ 198/460.1, 461.1, 198/461.2, 461.3, 443, 448

[56] References Cited

U.S. PATENT DOCUMENTS

| | | | |
|---|---|---|---|
| 3,323,633 | 6/1967 | Engel et al. | 198/461.1 X |
| 4,811,832 | 3/1989 | Niemann | 198/443 |
| 4,934,510 | 6/1990 | Lutgendorf | 198/461.3 |
| 5,141,097 | 8/1992 | Oiry et al. | 198/460.1 |
| 5,147,023 | 9/1992 | Meindl | 198/448 X |
| 5,165,520 | 11/1992 | Herve et al. | 198/460.1 |
| 5,222,586 | 6/1993 | Ydoate et al. | 198/443 X |
| 5,415,281 | 5/1995 | Taylor et al. | 198/448 |

*Primary Examiner*—James R. Bidwell
*Attorney, Agent, or Firm*—Marger, Johnson, McCollom & Stolowitz P.C.

[57] ABSTRACT

A first conveyor belt has a transverse tilt from horizontal and a wall along one side. Crushed plastic containers dropped onto the belt fall against the wall and are thus aligned under gravity action. The first belt transfers aligned containers to a second belt operating at a faster rate of speed and having a width capable of supporting only a single article in the transverse direction. The second belt transfers the containers to a third belt operating at a faster rate of speed than the second belt thereby further spacing the containers one from another. A scanner checks the spacing of each adjacent pair of containers and causes an air cannon to blow containers from the third belt when spacing does not conform to a predetermined spacing criteria. Containers falling from the end of the first belt and those blown from the third belt are received by a hopper having a conveyer therein which returns such containers to the first belt.

28 Claims, 5 Drawing Sheets

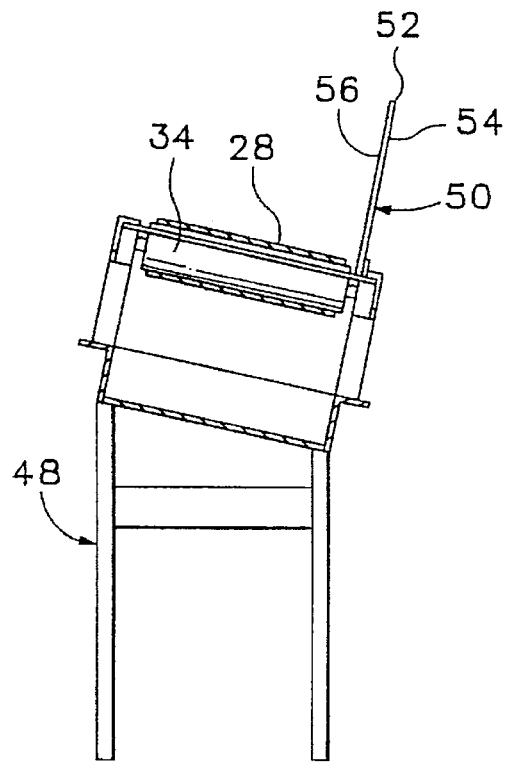
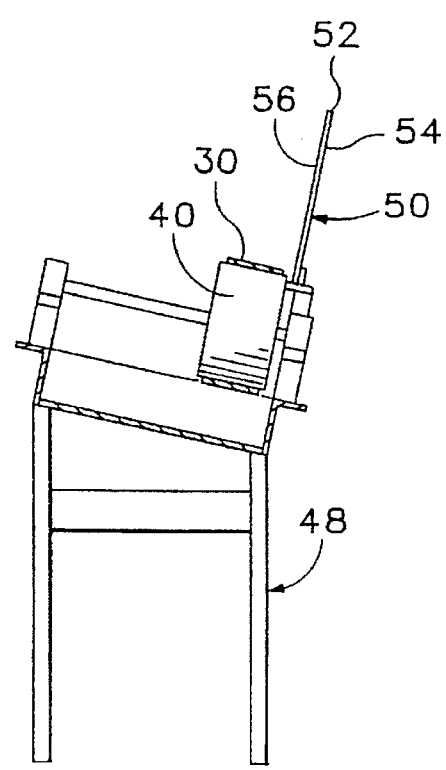
FIG.4    FIG.5
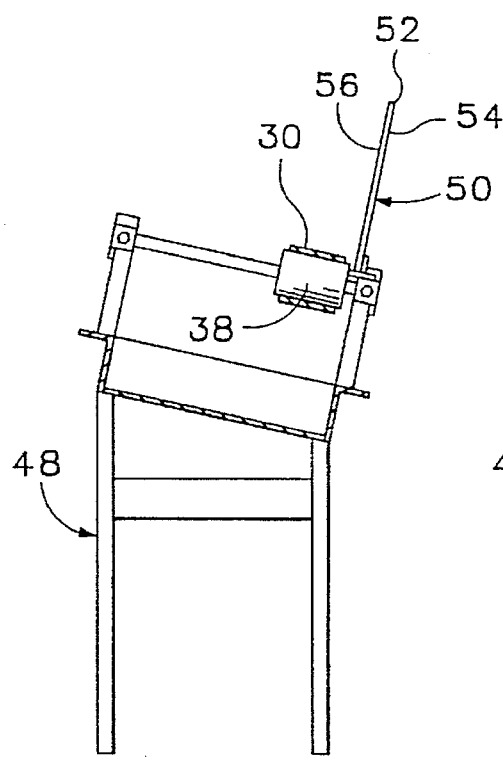
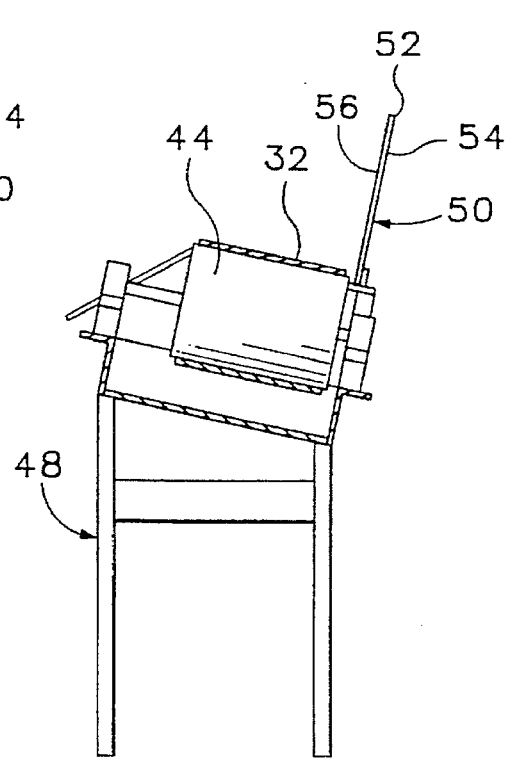
FIG.6    FIG.7

METHOD AND APPARATUS FOR ALIGNING AND SPACING ARTICLES ON A CONVEYOR BELT

BACKGROUND OF THE INVENTION

1. Field of the Invention

The present invention relates to methods and apparatus for aligning and spacing articles on a conveyor belt and more particularly to such methods and apparatus which accelerate each article to a higher rate of speed one after another thereby increasing the space between each article.

2. Description of the Related Art

Used plastic containers must be sorted by plastic type when they are recycled. There is a commercially available scanner which differentiates between the various plastic resins based on opacity, shape and color. Another commercially available scanner recognizes polyvinylchloride. Both of these scanners scan a single used plastic container at rates as high as 8000 to 10,000 containers per hour. For recycling of used plastic containers to be economical, the used containers must be fed to the scanners in single file at a high rate of speed with a minimum gap between each container. This feed process is referred to in the industry as singulation.

For a singulation system to be effective it must accurately align and space the used containers and must feed the aligned and spaced containers to the scanner at its maximum feed rate to optimize efficiency of the operation. If either the feed rate is low or the articles are aligned and spaced inaccurately, the overall efficiency of the recycling operation is not optimized.

It would be advantageous to provide a method and apparatus for aligning and spacing articles on a conveyer belt which operates at a high rate of speed and which accurately aligns and spaces the articles.

SUMMARY OF THE INVENTION

A method for aligning and spacing articles on a conveyor belt in which the articles are dropped onto a first conveyer belt having a transverse tilt from horizontal. Substantially all of the articles are transferred to a second conveyer belt operating at a faster rate of speed than the first conveyer belt and having a width capable of supporting only a single article in the transverse direction. In another aspect of the invention, the articles are transferred to a third conveyor belt operating at a faster rate of speed than the second conveyor belt. The spacing between the adjacent articles on one of the second and third belts is sensed. When the sensed spacing deviates from predetermined spacing criteria, articles are pushed from the belt. In still another aspect of the invention, articles dropping from the end of the first belt and articles pushed from the belt are caught and transported to the first conveyer belt where they are again dropped thereon.

Apparatus for implementing the method of the present invention is also provided.

It is a general object of the present invention to provide a method and apparatus for aligning and spacing articles on a conveyor belt which operates at a high rate of speed while accurately aligning and spacing the articles.

The foregoing and other objects, features and advantages of the invention will become more readily apparent from the following detailed description of a preferred embodiment which proceeds with reference to the drawings.

BRIEF DESCRIPTION OF THE DRAWINGS

FIG. 4 is an enlarged side elevational view taken along lines 4—4 in FIG. 2.

FIG. 5 is an enlarged side elevational view taken along lines 5—5 in FIG. 2.

FIG. 6 is an enlarged side elevational view taken along lines 6—6 in FIG. 2.

FIG. 7 is an enlarged side elevational view taken along lines 7—7 in FIG. 2.

DETAILED DESCRIPTION OF THE PREFERRED EMBODIMENT

Figure 1:
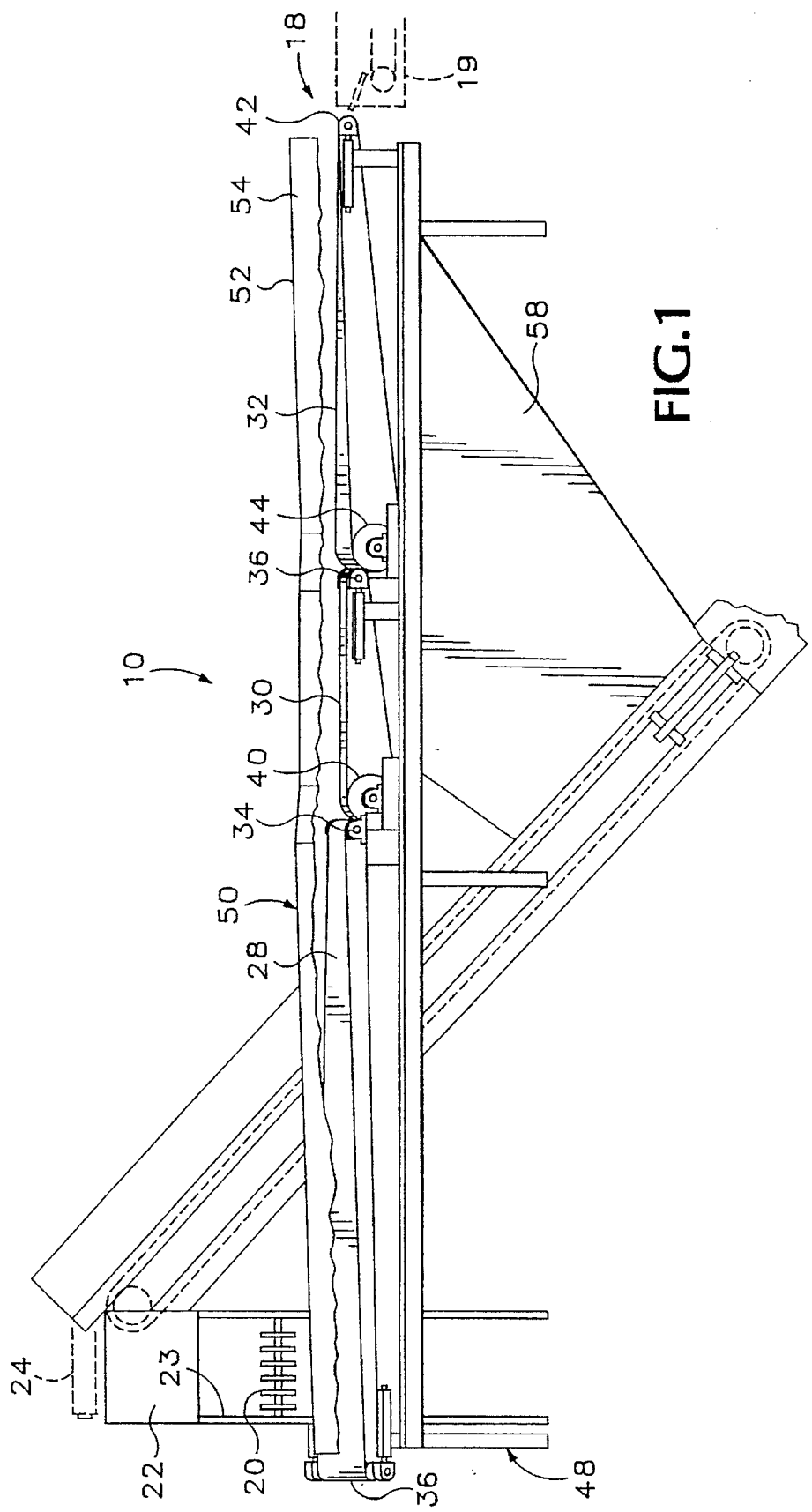
FIG. 1 is a front elevation view of a singulator constructed in accordance with the present invention with portions of the structure broken away.

Indicated generally at 10 in FIG. 1 is a singulator constructed in accordance with the present invention. The singulator includes an infeed section, indicated generally at 12, in which used plastic containers, like containers 14, 16, are provided to the singulator. The containers are typically used consumer products such as milk jugs, soft drink containers, etc. Although not shown in the drawings, the containers are crushed using a commercially available machine prior to being provided to in feed section 12 of the singulator.

Singulator 10 includes an outfeed section, indicated generally at 18, at which the containers leave the singulator substantially aligned with one another and with a minimum gap between adjacent containers. In the present embodiment of the invention, the containers leave out feed section 18 at a rate of approximately 8000 to 10000 containers per hour. The containers are provided to a commercially available plastic scanner 19, a portion of which is shown in dashed lines, which sorts containers in a known manner based on the resin from which each container is made.

Returning again to infeed section 12, included therein is a rotary disc screen 20. The rotary disc screen includes a surrounding wall 22 having an opening 23, in FIG. 1. In the present embodiment of the invention the disc screen is constructed in accordance with copending U.S. application Ser. No. 08/263,524, and assigned to the assignee of the present application, which is incorporated herein by reference.

Figure 3:
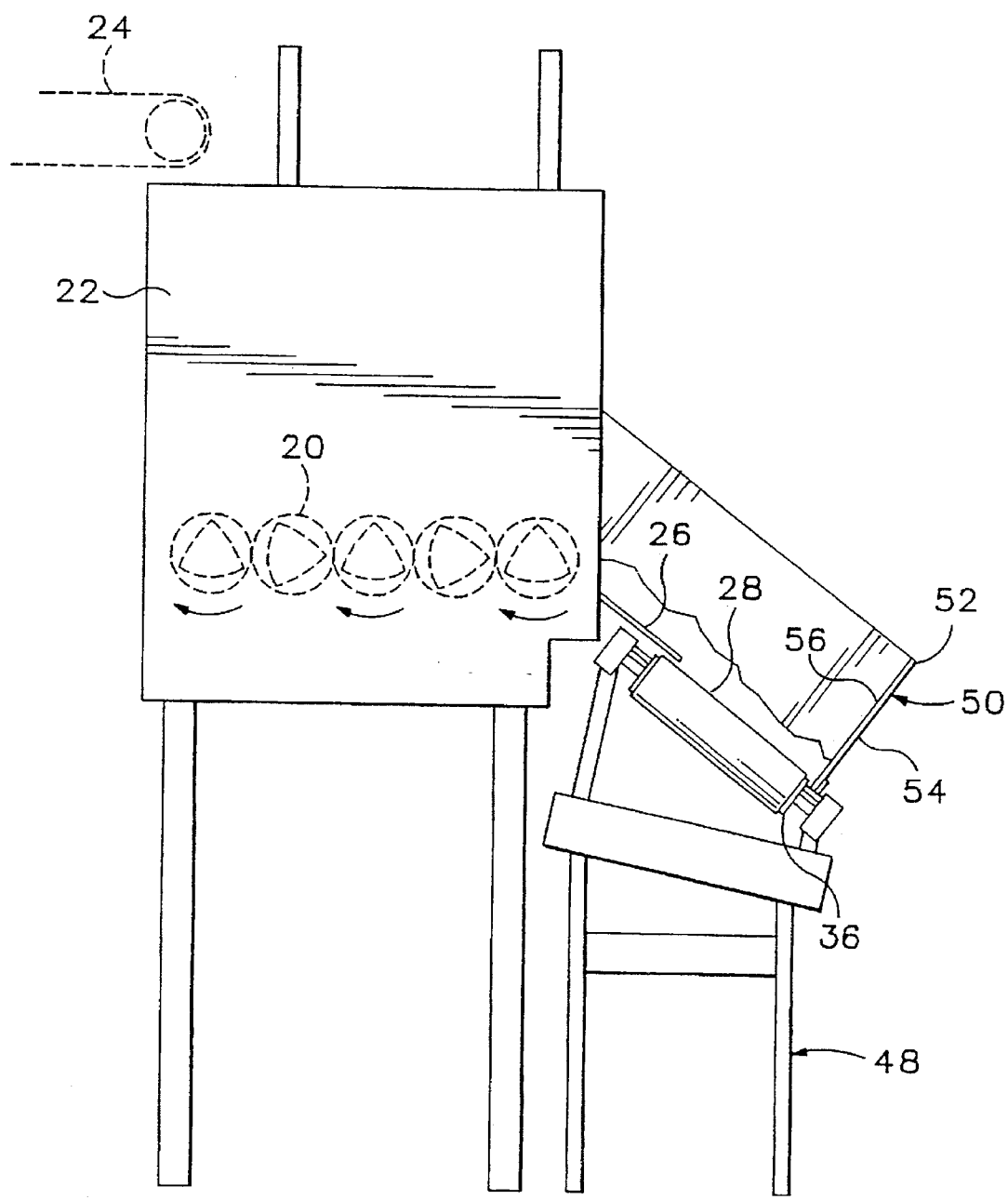
FIG. 3 is an enlarged side elevational view taken along lines 3—3 in FIG. 2 with portions of the structure broken away.
Figure 8:
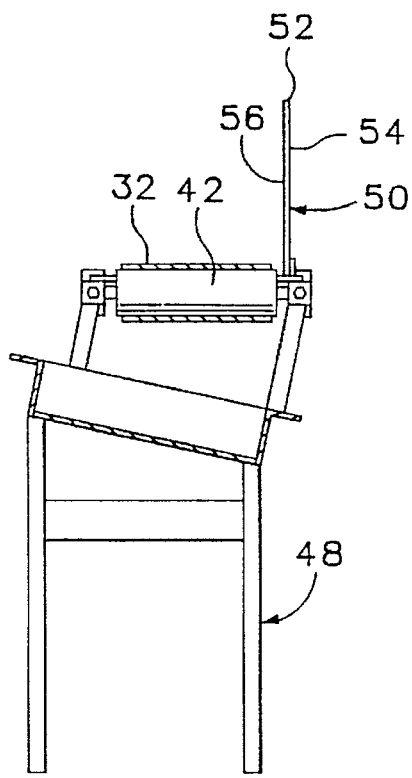
FIG. 8 is an enlarged side elevational view taken along lines 8—8 in FIG. 2.

Generally speaking, containers drop onto screen 20 from a conveyor 24, in FIGS. 1 and 3. Rotation of the discs shown in dashed lines in FIG. 3, in the direction indicated by the arrows, causes the containers to move from left to right as viewed in FIG. 3. In addition, the spacing between the discs causes undersized articles, such as plastic fragments or bottle caps, to drop between the rotating discs. When the containers arrive at the rightmost edge of the disc screen, they are moving in a substantially planar flow, i.e. the containers are not stacked on top of one another.

Figure 2:
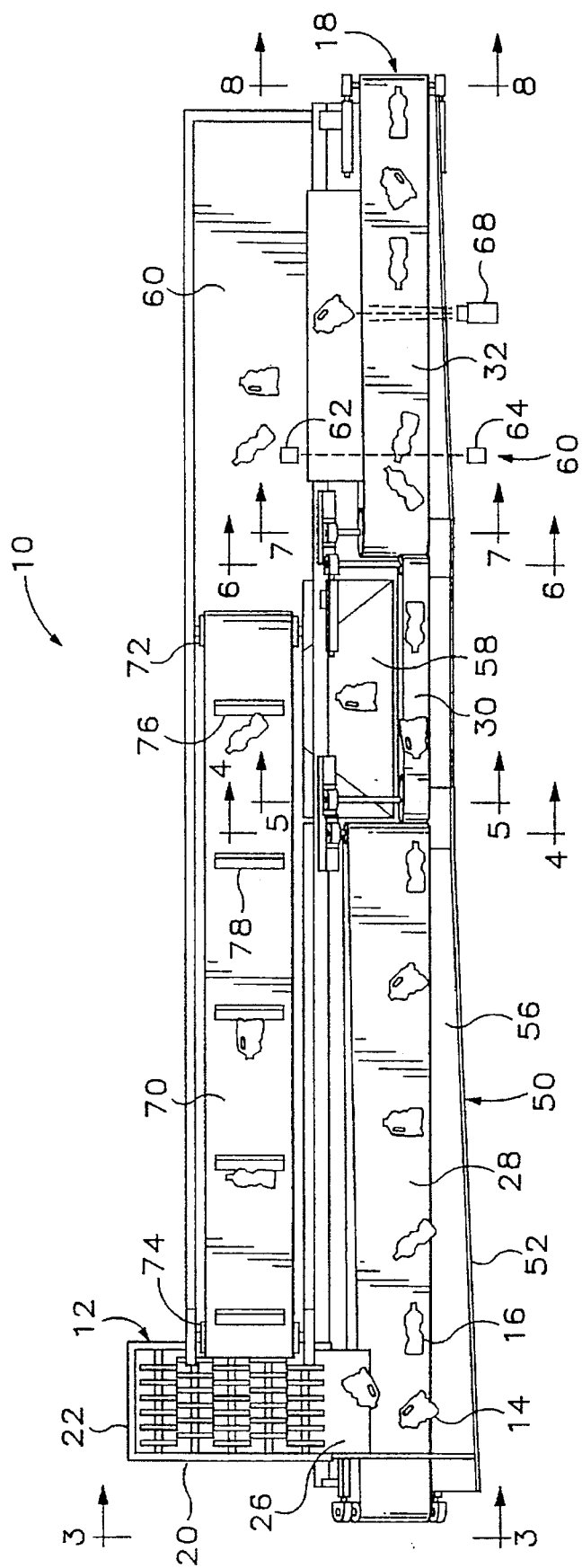
FIG. 2 is a top plan view of the singulator of FIG. 1.

As best viewed in FIGS. 2 and 3, as the containers leave disc screen 20 they slide via a planar ramp 26 onto a first conveyor belt 28. As is best viewed in FIG. 2, conveyor belt 28 is adjacent a second conveyor belt 30 which in turn is adjacent a third conveyor belt 32. Each of the conveyor belts includes a head roller and a tail roller, like head roller 34 and tail roller 36 for belt 28; head roller 38 and tail roller 40 for belt 30; and head roller 42 and tail roller 44 for belt 32. Each of the rollers is mounted on an axle in the usual fashion with the head roller being driven and the tail roller being an idler roller as is also customary. In the present embodiment of the invention, head roller 34 is driven to create a speed of 230 feet per minute for belt 28; head roller 38 is driven to create a speed of 290 feet per minute for belt 30 and head roller 42 is driven to create a speed of 350 feet per minute for belt 32. The details of the manner in which each of the head rollers is driven are readily understandable by those having ordinary skill in the art and are therefore not further discussed herein.

With reference to FIG. 1, the conveyors are supported on a frame 48 which is also viewable in FIGS. 3–8. As can be seen in FIGS. 3–8 each of the conveyor rollers is mounted for rotation on an axle which in turn is mounted on frame 48. As can also be seen in these views, some of the rollers, and therefore the belt associated therewith, are tilted transversely from the horizontal. In the present embodiment of the invention, roller 36 in FIG. 3 is at an angle of approximately 38° while rollers 34, 40, 38, and 32 are each at an angle of approximately 12° with roller 42 being substantially horizontal. It can thus be seen that the head of belt 28 is substantially coplanar with the tail of belt 30 and the head of belt 30 is substantially coplanar with the tail of belt 32.

A wall 50, in FIGS. 1 and 2, extends from the tail of conveyor 28 to the head of conveyor 32. The wall includes an upper edge 52, an outer side 54 (visible in FIG. 1) and an inner side 56 (visible in FIG. 2). As can be seen in FIGS. 3–8 the angle of the wall changes with the angle of the belt to which the wall is adjacent to maintain a substantially 90° angle between each of the belts and the wall along the length of the singulator. As is best viewed in FIG. 2, belt 30 is substantially narrower than belt 28 with a width capable of supporting only a single container in the transverse direction of the belt. As is depicted in the drawing, containers falling onto the tail of belt 28 slide down against wall 50, which prevents the containers from rolling off of belt 28, and therefore are substantially all aligned with belt 30 at the head of belt 28. If, however, a container is not adjacent to wall 50 at the head of belt 28, the container may fall into a hopper 58 positioned between belts 28, 32 and adjacent the side of belt 30 opposite wall 50. A more detailed description of hopper 58 and associated structure is provided later herein.

As containers are transferred first from conveyor 28 to conveyor 30 and next from conveyor 30 to conveyor 32, the space between the articles increases due to the increased speed of each subsequent conveyor.

Figure 9:
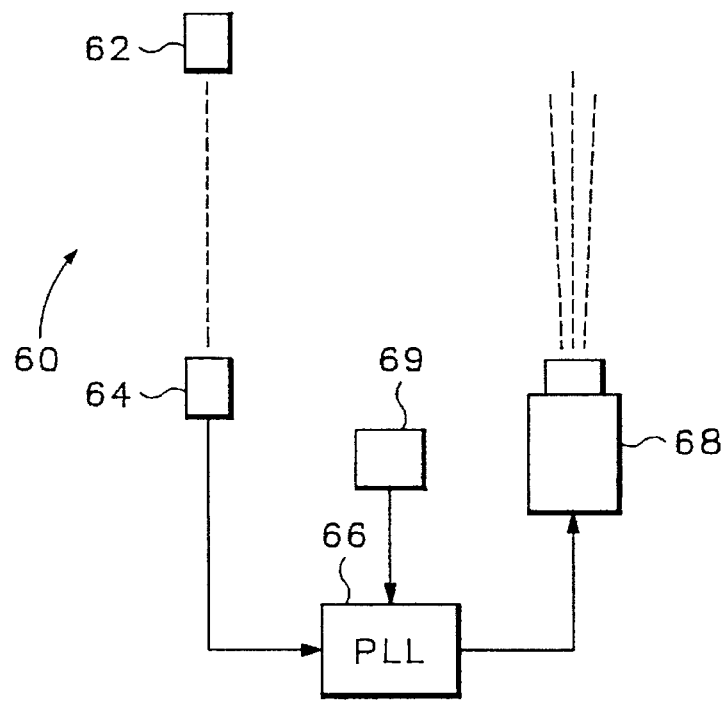
FIG. 9 is a schematic diagram of a programmable logic controller, a sensor and an air cannon incorporated in the singulator of FIGS. 1–8.

A commercially available photoelectric scanner, indicated generally at 60 in FIG. 2, includes a light source 62 and a detector 64. As can be seen in FIG. 9, the output of detector 64 is provided to a commercially available programmable logic control unit 66. An output of unit 66 is provided to a commercially available air cannon 68, also schematically depicted in FIG. 2. A commercially available rotary encoder is connected to the drive system for belts 32 in a known manner thereby providing information to control unit 66 about the position of an object received in scanner 60 relative to the position of air cannon 68. As will later be described more fully herein, scanner 60 generates signals indicative of the length of each container passing thereby as well as the gap between each pair of adjacent containers. Such signals are provided to unit 66 which stores a predetermined spacing profile and which is operable to generate a signal actuating air cannon 68 to blow a selected container off belt 32 into a hopper 60, which communicates with hopper 58.

Containers blown into hopper 60, as well as those blown into hopper 58, fall onto the lower end of a conveyor belt 70 wound over a lower tail roller 72 and an upper head roller 74, which is driven to move belt 70 right to left as viewed in FIG. 2. A plurality of flights, like flights 76, 78 are mounted on belt 70 and urge containers in hoppers 58, 60 onto belt 70 thereby transporting the same to the top of the belt. At the top of the belt containers are dropped onto rotary disc screen 20 with any additional incoming containers dropped onto the screen from conveyor 24 in FIG. 3.

As viewed in FIG. 1, containers properly spaced and aligned are transferred from the head of belt 32 onto plastic scanning system 19, partially shown in dashed lines in FIG. 1, which receives the containers and sorts them according to plastic type.

In operation, flattened containers are provided to singulator 10 via belt 24, in FIG. 3. The containers fall onto screen 20 which in turn transports the containers onto the tail of belt 28 via ramp 26 as previously described. Under the force of gravity the containers fall against inner side 56 of wall 50. As can be seen in FIG. 1, and by comparing the relative angles of tail roller 36 with head roller 34 in FIGS. 3 and 4, respectively, belt 28 is twisted, i.e. the degree of transverse tilt from the horizontal changes along the length of the belt. As can be seen in FIG. 2, containers approaching the head of belt 28 are for the most part received substantially against inner side 56 of wall 50, resulting from the action of gravity when the containers are first dropped onto belt 28 and during transport therealong. Substantially all of the containers are, therefore, in line with belt 30. Such aligned containers are transferred from belt 28 to belt 30, which speeds up the rate of travel of each container thereby increasing the space between each container and the following container. Those containers on belt 28 but not aligned with belt 30 fall into hopper 58 to be transported by belt 70 back to screen 20 as previously described. The containers on belt 30 are transferred to belt 32 which again increases spacing between adjacent containers due to the increased speed of belt 32 relative to belt 30. All containers arriving on belt 32 should therefore be properly aligned and spaced. Scanner 62 and air cannon 60, however, provide quality control by measuring container length and spacing between containers to confirm that all containers provided to the plastic typing system 19 are appropriately spaced from one another.

With reference to FIG. 9, rotary encoder 69 provides signals to programmable logic control unit 66 in a known manner to indicate the position of belt 32. Sensor 64 in scanner 60 generates signals indicative of the presence or absence of a container between it and light source 62. These signals taken together with those from rotary encoder 69 are used by unit 66 to calculate both container length and the gap between each pair of adjacent containers.

Unit 66 is programmed to evaluate container spacing in several ways. The first comprises a gap check with gap being defined as the distance from the trailing end on one container to the leading end of the next container. If any gap is less than two inches, unit 66 triggers air cannon 68 to generate a blast of air which blows the trailing container from the belt into hopper 60 in FIG. 2. Unit 66 uses the signals from encoder 69 to calculate when the trailing container is adjacent to the air cannon 68.

In the second type of check, the scanner compares the length of each scanned container against a maximum container length which in the present case is 19 inches. If a length greater than 19 inches is measured, the system assumes that adjacent containers are overlapped but not to the extent that blowing off the trailing container would also interfere with the position of the leading container. Accordingly, when a length greater than 19 inches is detected, an air blast is triggered to blow off the trailing container. The minimum gap logic described above for the measured gap between the trailing container and the next container is ignored because the trailing container is blown from the belt thereby insuring sufficient gap.

In a third type of check, also relating to an overlength condition, if the maximum length is between 14 inches and 19 inches the system assumes that adjacent containers are overlapped to the extent that the trailing container cannot be blown off without disturbing the position of the leading container; both containers are therefore blown from the belt.

In a fourth check, if there is no gap occurring after a predetermined measured belt length (as detected by rotary encoder 69, which in the present embodiment is 300 inches, unit 66 generates a signal which stops conveyer drive action. Under such circumstances control unit 66 assumes something is wrong with the material flow, e.g., a container is stuck between light source 62 and sensor 64.

The four evaluations or checks described above are referred to herein as a predetermined spacing profile.

It will be appreciated that scanner 60, rotary encoder 69, air cannon 68 and programmable logic control unit 66 are each commercially available and can be installed to operate as described above in singulator 10 by a person having ordinary skill in the art.

Containers ejected by air cannon 68 from belt 32 fall into hopper 60 and are conveyed via conveyor 70, as is the case with containers dropping off the end of belt 28 into hopper 58, to infeed section 12 of singulator 10 as described above.

A method and apparatus for aligning and spacing containers at a high rate of speed and with accurate spacing has thus been described.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A method for aligning and spacing articles on a conveyor belt comprising the steps of:
   dropping the articles onto a first end of a first conveyor belt having a transverse tilt from horizontal;
   transferring substantially all of the articles from a second end of said first conveyor belt to a first end of a second conveyor belt having a width capable of supporting only a single article in the transverse direction; and
   operating said second conveyer belt at a faster rate of speed than said first conveyor belt.

2. The method of claim 1 wherein the first end of said first conveyor belt has a greater transverse tilt than the second end.

3. The method claim 2 wherein said second conveyor belt has a transverse tilt substantially equal to the transverse tilt of the second end of said first conveyor belt.

4. The method of claim 1 wherein said method further includes the step of transferring the articles to a third conveyor belt operating at a faster rate of speed than said second conveyor belt.

5. The method of claim 4 wherein said method further includes the step of:
   sensing the spacing between adjacent articles on one of said second and third belts; and
   pushing articles from said belt when the sensed spacing deviates from a predetermined spacing criteria.

6. The method of claim 5 wherein said method further comprises the steps of:
   catching the articles pushed from said belt;
   transporting the caught articles to the first conveyor belt; and
   dropping the articles onto the first conveyor belt.

7. The method of claim 1 wherein said method further comprises the steps of:
   providing a wall along one side of the first conveyor against which substantially all of the articles slide responsive to the transverse tilt of the first conveyor; and
   dropping articles which are not transferred to the second conveyor belt off the second end of the first conveyor.

8. The method of claim 7 wherein said method further comprises the steps of:
   catching the articles dropped from the second end of the first conveyor;
   transporting the caught articles to the first conveyor belt; and
   dropping the articles onto the first conveyor belt.

9. The method of claim 1 wherein said method further comprises the step of arranging the articles in a single layer prior to the step of dropping the articles onto the first conveyor belt.

10. Apparatus for aligning and spacing articles on a conveyor belt comprising:
    a first conveyor belt having an output end and a transverse tilt from horizontal for receiving articles dropped thereon;
    a wall along one side of said first conveyor belt for preventing articles from sliding off of the belt and for generally aligning the articles on the first belt adjacent the wall; and
    a second conveyor belt having an input end and a width capable of supporting only a single article in the transverse direction, said input end of said second belt being adjacent to said output end of said first belt to receive such aligned articles, and said second conveyor belt being operable at a faster rate of speed than said first conveyor belt.

11. The apparatus of claim 10 wherein the first end of said first conveyor has a greater transverse tilt than the second end.

12. The apparatus of claim 11 wherein the second conveyor belt has a transverse tilt substantially equal to the transverse tilt of the second end of said first conveyor belt.

13. The apparatus of claim 12 wherein said apparatus further includes a third conveyor belt aligned with said second conveyor belt to receive articles from said second conveyor belt and being operable at faster rate of speed than said second conveyor belt.

14. The apparatus of claim 13 wherein said third conveyor belt has a first end having a transverse tilt from horizontal substantially equal to the tilt of the second end of said second conveyor belt and a second end which is substantially horizontal.

15. The apparatus of claim 13 wherein said apparatus further includes:
    means for sensing the spacing of articles on one of said second and third belts;
    a predetermined spacing profile; and
    means for pushing an article from said belt when the sensed spacing deviates from the spacing profile.

16. The apparatus of claim 15 wherein said apparatus further includes:

a hopper for catching articles pushed from said belt; and a conveyor for transporting articles in the hopper to the first conveyor.

17. The apparatus of claim 10 wherein said apparatus further includes:

a hopper for catching articles falling from the second end of said first conveyor; and a conveyor for transporting articles in the hopper to the first conveyor.

18. The apparatus of claim 10 wherein said apparatus further includes means for feeding articles to said first conveyor belt in a single layer.

19. A method for aligning and spacing articles on a conveyor belt comprising the steps of:

dropping the articles onto a first conveyor belt having a transverse tilt from horizontal, said transverse tilt being greater at the first end of said first conveyer belt than the second end; and transferring substantially all of the articles to a second conveyor belt operating at a faster rate of speed than said first conveyor belt and having a width capable of supporting only a single article in the transverse direction.

20. The method of claim 19 wherein said second conveyor belt has a transverse tilt substantially equal to the transverse tilt of the second end of said first conveyor belt.

21. A method for aligning and spacing articles on a conveyor belt comprising the steps of:

dropping the articles onto a first conveyor belt having a transverse tilt from horizontal;

transferring substantially all of the articles to a second conveyor belt operating at a faster rate of speed than said first conveyor belt and having a width capable of supporting only a single article in the transverse direction;

providing a wall along one side of the first conveyor against which substantially all of the articles slide responsive to the transverse tilt of the first conveyor;

dropping articles which are not transferred to the second conveyor belt off the end of the first conveyor;

catching the articles dropped from the second end of the first conveyor;

transporting the caught articles to the first conveyor belt; and dropping the articles onto the first conveyor belt.

22. Apparatus for aligning and spacing articles on a conveyor belt comprising:

a first conveyor belt having a transverse tilt from horizontal for receiving articles dropped thereon, said transverse tilt being greater at the first end of said first conveyer belt than the second end;

a wall along one side of said first conveyor belt for preventing articles from sliding off of the belt and for generally aligning the articles on the first belt adjacent the wall; and a second conveyor belt having a width capable of supporting only a single article in the transverse direction, said second belt being aligned with said first belt to receive such aligned articles and being operable at a faster rate of speed than said first conveyor belt.

23. The apparatus of claim 22 wherein the second conveyor belt has a transverse tilt substantially equal to the transverse tilt of the second end of said first conveyor belt.

24. The apparatus of claim 23 wherein said apparatus further includes a third conveyor belt aligned with said second conveyor belt to receive articles from said second conveyor belt and being operable at faster rate of speed than said second conveyor belt.

25. The apparatus of claim 24 wherein said third conveyor belt has a first end having a transverse tilt from horizontal substantially equal to the tilt of the second end of said second conveyor belt and a second end which is substantially horizontal.

26. The apparatus of claim 24 wherein said apparatus further includes:

means for sensing the spacing of articles on one of said second and third belts;

a predetermined spacing profile; and means for pushing an article from said belt when the sensed spacing deviates from the spacing profile.

27. The apparatus of claim 26 wherein said apparatus further includes:

a hopper for catching articles pushed from said belt; and a conveyor for transporting articles in the hopper to the first conveyor.

28. Apparatus for aligning and spacing articles on a conveyor belt comprising:

a first conveyor belt having a transverse tilt from horizontal for receiving articles dropped thereon;

a wall along one side of said first conveyor belt for preventing articles from sliding off of the belt and for generally aligning the articles on the first belt adjacent the wall;

a second conveyor belt having a width capable of supporting only a single article in the transverse direction, said second belt being aligned with said first belt to receive such aligned articles and being operable at a faster rate of speed than said first conveyor belt;

a hopper for catching articles falling from the second end of said first conveyor; and a conveyor for transporting articles in the hopper to the first conveyor.

* * * * *